United States Patent [19]  [11] 4,205,813
Evans et al.  [45] Jun. 3, 1980

[54] THRUST VECTORING APPARATUS FOR A VTOL AIRCRAFT

[75] Inventors: Robert C. Evans, Cincinnati, Ohio; Robert C. Ammer, Bright, Ind.

[73] Assignee: General Electric Company, Cincinnati, Ohio

[21] Appl. No.: 916,627

[22] Filed: Jun. 19, 1978

[51] Int. Cl.² ............................................. B64C 15/06
[52] U.S. Cl. ............................ 244/12.5; 60/226 R; 60/229; 239/265.29; 244/23 D; 244/110 B
[58] Field of Search ................... 244/12.5, 12.4, 23 D, 244/55, 52, 110 B; 239/265.25, 265.27, 265.29, 265.31; 60/226 R, 226 A, 229, 263, 271

[56] References Cited
U.S. PATENT DOCUMENTS

| 3,000,177 | 9/1961 | Logerot et al. | 239/265.27 X |
| 3,126,171 | 3/1964 | Stepniewski et al. | 244/12.5 |
| 3,248,878 | 5/1966 | Clark et al. | 244/110 B X |
| 3,262,268 | 7/1966 | Beavers | 60/226 A |
| 3,280,560 | 10/1966 | Marchant et al. | 244/12.5 X |
| 3,769,797 | 11/1973 | Stevens | 239/265.29 X |
| 3,797,785 | 3/1974 | Baerresen et al. | 244/12.5 X |
| 4,030,291 | 6/1977 | Sargisson | 239/265.29 X |

Primary Examiner—Barry L. Kelmachter
Attorney, Agent, or Firm—Dana F. Bigelow; Derek P. Lawrence

[57] ABSTRACT

Cascades and associated blocker doors are provided in the lower section of a turbofan engine nacelle such that when the blocker doors are closed the bypass flow is diverted through the open cascades to produce vertical thrust. Vanes are provided in the cascades to assist in directing the diverted airflow in the downward direction. The upper section of the bypass duct is isolated from the lower cascade section by way of horizontal struts extending across the bypass duct. A pair of outer doors may be provided over the cascades such that, when opened, they act to provide side skirts to guide the downward flow of air.

11 Claims, 4 Drawing Figures

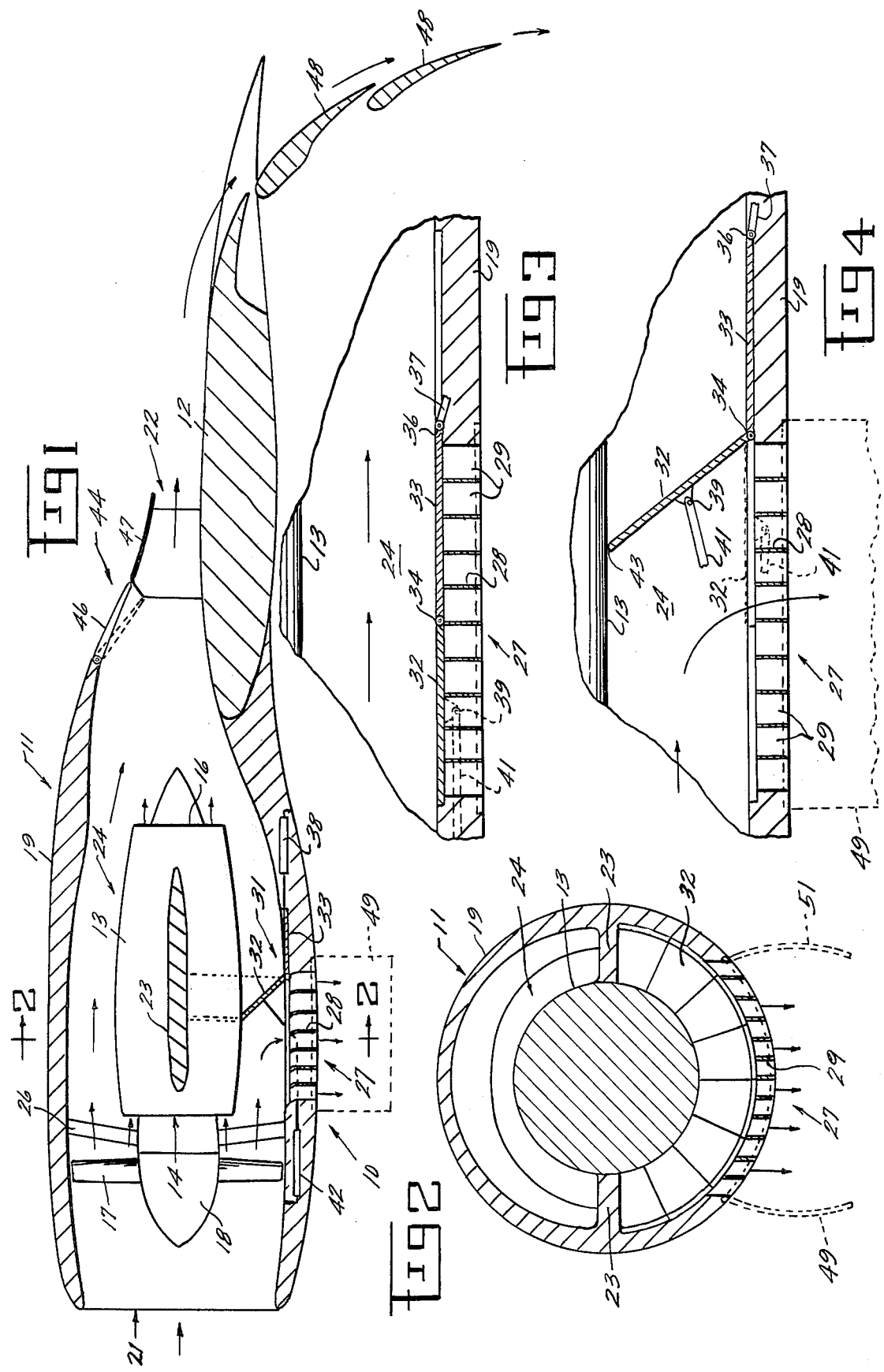

THRUST VECTORING APPARATUS FOR A VTOL AIRCRAFT

BACKGROUND OF THE INVENTION

This invention relates generally to gas turbine engines, and more particularly, to thrust directing apparatus for aircraft engines applied to aircraft of the VTOL (vertical takeoff and landing) type.

The so-called VTOL aircraft embodies a concept which incorporates the advantages of both the fixed wing aircraft and the helicopter to enable both vertical takeoff and landing and efficient horizontal high-speed flight. This flexibility is generally obtained by the use of gas turbine engines to develop thrust which is, in turn, directed to either the vertically downward (lift) or horizontally rearward (cruise) directions. Since it is inefficient to provide separate engines for lift and cruise, a common approach is to use a plurality of gas turbine engines which are adaptable to varying their thrust forces from the vertical to the horizontal direction by way of appropriate thrust deflecting means such as, for example, a clam-shell nozzle, or by way of separate lift augmenter devices such as, for example, remote gas-coupled turbotip fans, gas-interconnected ejectors or shaft-interconnected fans.

During the vertical takeoff or landing mode of operation, the propulsion system must provide not only the total lift force substantially equal to the aircraft gross landing weight but also must provide the proper force distribution in order to maintain adequate aircraft attitude control. Traditionally, this stability has been provided by the use of at least three lift-producing mechanisms or fans, one in each wing and one in the nose of the aircraft. The three remote lift/cruise fans are driven by a pair of gas turbine engines and are operated in the lift mode only during takeoff and landing. For horizontal flight, the thrust may be directed rearwardly directly from the gas turbine engines, or the fans located in the wings may be modulated to direct the thrust rearwardly. But the remote fan located in the nose section of the aircraft can only be used for lift and contributes no propulsive thrust during the period of horizontal flight operation.

In addition to the inefficiency of having a fan which is only used during the lift mode of operation, another reason why it is undesirable to use remote fans is that the size that is required for the large thrust levels necessarily has a limited tip speed and thus the shaft speeds are accordingly limited. This, in turn, makes it difficult to obtain an efficient match-up between the fan and the engine turbine design, unless reduction gears are employed. Reduction gears are undesirable because of increased weight and system complexity.

Another problem associated with VTOL-type aircraft is the difficulty in transitioning between the vertical and horizontal modes of operation. That is, when transitioning from the horizontal to the vertical mode of operation, it is necessary to simultaneously reduce the horizontal thrust from a high level to essentially zero and increase the vertical thrust from zero to a high level. At the same time, it is necessary to maintain the attitude of the aircraft in a stable position. This, of course, must be accomplished with a very high margin of safety.

It is therefore an object of the present invention to provide a gas turbine engine which can be used to produce thrust for both lift and cruise conditions of a VTOL aircraft.

Another object of the present invention is the provision in a VTOL aircraft for eliminating the need of remote fans used for lift purposes only.

Yet another object of the present invention is the provision in VTOL aircraft for the elimination of a remote fan in the nose section of the aircraft.

Still another object of the present invention is the provision in a VTOL aircraft for providing pitch control with the use of a single engine.

Yet another object of the present invention is the provision of a turbofan engine which can selectively provide either horizontal or vertical thrust.

Still another object of the present invention is the provision in a turbofan for effectively and safely transitioning between horizontal and vertical thrust modes of operation.

These objects and other features and advantages become more readily apparent upon reference to the following description when taken in conjunction with the appended drawing.

SUMMARY OF THE INVENTION

Briefly, in accordance with one aspect of the invention, a turbofan engine has provided, in the lower portion of its nacelle, a plurality of blocker doors for selectively blocking the bypass duct, and an associated cascade port for diverting the blocked bypass flow from the nacelle in the downward direction. When the blocker doors are in the stowed or opened position, the fan flow passes entirely through the bypass duct to exhaust at the rear of the engine. When the blocker doors are closed to block off the bypass duct and expose the cascade port, the bypass flow in the lower portion of the bypass duct is entirely diverted downwardly to produce vertical thrust.

By another aspect of the invention, a horizontal or near-horizontal bifurcation strut extends across the bypass duct, between the core and the outer nacelle, to isolate the lower portion of the bypass duct from the upper portion thereof. In this way, when the blocker doors are opened, the air which is blocked is prevented from flowing into the upper portion of the bypass duct and is diverted entirely to the vertical thrust vector. The bifurcation strut extends well forward of the blocker doors such that the blocked air in the lower portion of the bypass is guided into the blocker door region and spillage over the front edge is controlled to a minimum.

By yet another aspect of the invention, longitudinal and lateral vanes are provided in the cascade port to direct the flow of air in the downward direction. Further, doors may be provided on either side of the cascade port such that, when opened, they provide side skirts to assist in maintaining the downward flow of air.

In the drawing as hereinafter described, a preferred embodiment is depicted; however, various other modifications and alternate constructions may be made thereto without departing from the true spirit and scope of the invention.

BRIEF DESCRIPTION OF THE DRAWING

FIG. 1 is a longitudinal cross-sectional view of a turbofan engine in accordance with the preferred embodiment of the invention;

FIG. 2 is a cross-sectional view thereof as seen along line 2—2 of FIG. 1;

FIG. 3 is an enlarged fragmentary sectional view thereof with the blocker doors in the open position; and FIG. 4 is a fragmentary sectional view of a portion thereof with the blocker doors in the closed position.

DESCRIPTION OF THE PREFERRED EMBODIMENT

Referring to FIG. 1, the invention is shown generally at 10 as incorporated in a turbofan engine 11 mounted on the upper surface of an aircraft wing 12. The turbofan engine 11 includes a core casing 13 having an inlet 14 and an exhaust opening 16. Air passes through the inlet 14, is compressed, burned with fuel and passed through the turbine section of the core and out the exhaust opening 16 in a manner well known in the art. Extending from the forward end of the core casing 13 is a low pressure shaft with associated fan 17 and spinner 18.

Surrounding the core casing 13 in concentric relationship is a nacelle 19 having an inlet opening 21 and an exhaust opening 22. The core casing 13 is supported within the nacelle 19 by way of a pair of struts 23 such that there is defined between the nacelle and the core casing 13 a bypass duct 24 for the conduct of bypass flow, into the inlet 21 through the bypass duct 24 and out the exhaust opening 22. A plurality of outlet guide vanes 26 may be provided downstream of the fan 17 to remove the swirl from the air leaving the fan 17.

In the lower section of the nacelle 19, below the pair of struts 23, there is formed in the nacelle a cascade opening 27 which provides for the flow communication between the bypass duct 24 and the outer side of the nacelle 19. This opening is generally rectangular in shape and is of a width which extends substantially through a 90° sector as can be seen in FIG. 2. Its length is such that it extends substantially the same distance and in the same axial position as the forward half of the struts 23. Disposed in the opening 27 is a cascade lattice structure comprising lateral and longitudinal ribs, 28 and 29, respectively, for directing the flow of air which may be diverted from the bypass duct 24 into the downward direction as it passes through the opening 27.

Located adjacent the cascade opening 27 is a plurality of blocker doors 31 having front and rear portions 32 and 33, respectively, pivotally interconnected by a hinge 34. Connected to one end of the rear portion 33 by way of a pin 36 (see FIG. 3) is a retracting link 37 which is translatable by way of an actuator 38 to move the blocker doors rearwardly. Connected to the blocker door front portion 32 by way of a pivotal fastening means 39 is a pivot link 41 which is attached at its other end to an actuator 42 for moving the blocker door forwardly.

Operation of the blocker doors 31 is described as follows. When the blocker doors are in the open position as shown in FIG. 3, the front and rear portions 32 and 33 form a linear section which covers the cascade opening 27 and forms the outer flow path of the bypass duct 24. When the operator wishes to obtain a vertical thrust component for vertical takeoff or landing, the combination is retracted rearwardly by way of the actuator 38 and connecting link 37 to expose the forward portion of the cascade opening 27 to the bypass duct 24. The blocker door front portion 32 will then be in the position shown by the dotted line in FIG. 4 and the hinge 34 will be positioned adjacent the rear edge of the cascade opening 27 as shown. To fully expose the cascade opening 27, the front portion 32 is then pivoted radially inwardly by way of the actuator 42 and pivot link 41 to the point where its forward edge 43 engages the periphery of the core casing 13. In this position the plurality of circumferentially adjacent blocker doors form the downstream end of a plenum which is defined, in addition, by the core casing 13 and the pair of struts 23 for supplying the cascade opening 27 with a flow of bypass air. It will be seen that the length of the front portion 32 is substantially greater than the radial extent of the bypass duct such that when the blocker door is in the position shown in FIG. 4, it is angled to present a flow turning profile to the incoming air. To close the doors, the actuator 42 retracts the pivot link 41 to pivot the front portion 32 to the downward position as indicated by the dotted line of FIG. 4, and then further retracts to translate the entire blocker door back into the open position as shown in FIG. 3.

In its simplest form as just described, the blocker door assembly comprises a plurality of adjacent door sections which operate in unison, and through identical angles, to define a uniform chamber between the pair of struts 23. It will be seen by reference to FIG. 2 that, though such a profile may be desirable for the blocker door sections near the center of the cascade opening, it may not be the most efficient for use adjacent the struts 23. Ideally, the blocker doors are so oriented that the flow characteristics are optimized to promote minimum loss as the flow is turned in the downward direction. This requires a staggering of the doors such that in combination they define an aerodynamic shape, such as a clamshell shape, for turning the flow of air. For this arrangement it would, of course, be necessary to provide a different actuation system than that described hereinabove. Preferably it would include a staggered arrangement wherein the adjacent doors would be rotated to different degrees while maintaining sealing relationship therebetween.

It will be recognized that, although the struts 23 are shown to divide the bypass duct into upper and lower substantially equal portions, the struts may be placed upwards or downwards of the positions shown in order to meet the desired performance characteristics. Further, the length and the particular placement of the struts 23 may be varied to provide for particular flow characteristics. Since the functions of the struts are to split the flow, to enhance the flow downward, and to prevent the flow from backing up and flowing into the upper section, it is desirable to have the struts extend as far forward as possible. However, it must not extend so far forward that it tends to back pressure the fan. Similarly, the degree of rearward extension may be varied so long as the airflow on the upper bypass duct is made to flow rearwardly to the area behind the blocker doors. As previously mentioned, in order to enhance downward flow from the cascade opening 27, the lattice ribs 28 and 29 are placed in that opening. Still there will be a tendency for the air to then turn up to the sides of the nacelle. This can be prevented, or at least delayed, by the use of a pair of side doors 49 and 51 which, when in the closed position, form the outer cover for the cascade opening and, when in the open position as shown in FIG. 2, form side skirts to maintain the downward flow pattern from the cascade opening.

Referring now to FIG. 1, operation of the engine will be described in terms of use in an upper surface blown aircraft installation. Here the engine is mounted at the forward edge of the aircraft wing 12 such that the flow from the engine exhaust opening 22 flows over the upper surface of the wing 12. Flow volume and pressure is varied by way of a variable area primary nozzle 44 having a plurality of circumferentially spaced pivotal flaps 46 for varying the nozzle throat area. A plurality of retractable flippers 47 may further be provided to vary the area of the nozzle.

At the trailing edge of the wing 12 is a plurality of flaps 48 which may be rotated to present a down-turned profile over which the air will tend to flow in accordance with the well-known coanda effect. In this way, the horizontal flow of exhaust gases from the nozzle 48 will flow rearwardly and follow the contour of the curved airfoils to present a resultant downward flow vector as shown in FIG. 1. It is with this arrangement, or another arrangement wherein the main engine exhaust flow is made to produce vertical thrust, such as, for example, a lower surface blown aircraft installation or a clam-shell type nozzle installation, with which the present invention is particularly applicable because of the resultant pair or axially spaced force vectors that are desirable for attitude control.

For horizontal flight, the blocker doors 31 are placed in the open position as shown in FIG. 3 and all of the bypass flow passes from the variable area exhaust nozzle 44 and flows rearwardly over the wing 12 to produce thrust in the forward direction. When vertical thrust is desired, for example when it is desired to land the aircraft, the variable area nozzle 44 and the blocker doors 31 are operated in combination to control the fan flow split between the cascade opening 27 and the primary exhaust opening 22. At the same time the flaps 48 are turned downward as shown in FIG. 1 to turn the flow from the primary nozzle in the downward direction. In this way, there are two axially spaced, upward thrust components which when properly controlled will provide not only the required total thrust but also pitch control of the engine and the aircraft. Transition between horizontal and vertical thrust is achieved by gradually opening the blocker doors in steps to eventually divert the entire flow at the lower portion of the bypass duct to the cascade opening 27. The pivotal flaps 46 and the retractable flippers 47 may be varied at the exhaust nozzle in order to accommodate the change in flow which is occasioned by the closing off of the bypass flow in the lower portion of the bypass duct. Transition from vertical to the horizontal mode of operation is essentially accomplished by reversing the above-described process. That is, the operator gradually closes the blocker doors 31 while at the same time varying the variable area nozzle 44 and placing the vanes 48 in the horizontal stowed position.

It will be understood that while the present invention is being described in terms of a preferred embodiment, it may take on any number of other forms while remaining within the scope and intent of the invention. For example, while the present invention has been described in terms of use with an upper surface blown aircraft installation, other installations such as a lower surface blown installation or a D-type nozzle may be used. Further, although the actuation system for the blocker doors 31 has been shown as a simple linkage and actuator system, various other methods such as, for example, hydraulic or pneumatic systems, may be used to move the blocker doors into the desired position.

Having thus described the invention, what is claimed as novel and desired to be secured by Letters Patent of the United States is:

1. An improved turbofan engine of the type having a core and a nacelle which together define a bypass duct wherein the improvement comprises:
    (a) a pair of diametrically opposed struts disposed horizontally between the core and nacelle to divide the bypass duct into upper and lower portions;
    (b) means for selectively blocking said lower portion of the bypass duct while leaving open said upper portion thereof, said blocking means being located directly below a portion of said struts to divert the air flowing in said lower bypass duct portion;
    (c) said struts inhibiting air within the upper bypass duct portion from flowing into the lower bypass duct portion and from being diverted by said blocking means; and
    (d) cascade means disposed in said nacelle forward of said blocking means for selectively diverting flow from said blocking means in a downward direction to produce lift.

2. An improved turbofan engine as set forth in claim 1 wherein said blocking means comprises a plurality of circumferentially adjacent blocker doors which extend radially across said bypass duct.

3. An improved turbofan engine as set forth in claim 2 wherein said blocker doors comprise forward and rear portions which are pivotally interconnected.

4. An improved turbofan engine as set forth in claim 3 wherein said forward portions have free ends which rest against the engine core housing when the blocker doors are in the blocking position.

5. An improved turbofan engine as set forth in claim 2 wherein said blocker doors form a part of the bypass duct outer boundary when the blocker doors are not in the blocking position.

6. An improved turbofan engine as set forth in claim 2 wherein said blocker doors cover said cascade means when the blocker doors are not in the blocking position.

7. An improved turbofan engine as set forth in claim 6 and including means for translating said blocker doors rearwardly to expose said cascade means to said bypass duct.

8. An improved turbofan engine as set forth in claim 1 and wherein said cascade means includes vanes for directing any airflow from the bypass duct in the downward direction.

9. An improved turbofan engine as set forth in claim 1 and including a pair of doors disposed in the nacelle which, when in the closed position, form the outer surface of the nacelle and a cover for said cascade means and, when in the open position, tend to direct the airflow from the cascade means in a downward direction.

10. An improved turbofan engine as set forth in claim 1 wherein said pair of struts are located axially adjacent said cascade means.

11. An improved turbofan engine as set forth in claim 1 wherein said pair of struts extend substantially the axial length of said cascade means.

* * * * *